Patented June 5, 1934

1,961,740

UNITED STATES PATENT OFFICE 1,961,740

HIDE PRESERVATION

Victor Conquest, Chicago, Ill., assignor to Armour and Company, Chicago, Ill., a corporation of Illinois No Drawing. Application July 25, 1932, Serial No. 624,661

3 Claims. (Cl. 149—1)

The present invention relates to a process for the treatment of hides, skins, and the like, and has particular reference to improvements in the treatment of green cattle hides for the purpose of preserving the same for subsequent tanning.

The present practice of treating raw cattle hides is to combine the hides fresh from the animal with dry salt. When made into a pack the "dry salted" hide will keep for a reasonable length of time without excessive bacterial decomposition, the moisture of the raw hide apparently causing the formation of a heavy salt solution which inhibits bacterial growth. Hides treated in this manner are said to be "salt cured" and are a standard article of commerce.

After the salt treatment, it is customary to store the hides for a suitable period of time for curing and to subject the salt cured hides to the usual tanning processes, which ordinarily includes a dehairing step.

The salt treatment has certain disadvantages which, although recognized by the art, have long been accepted without change. The strong salt solution will inhibit the growth of certain types of bacteria, but does allow sufficient bacterial growth to cause the loss of appreciable quantities of hide substance. Also, the salt is generally used in considerable excess of the amount which actually goes into solution and acts as an inhibitor of bacterial growth, and this excess weight of salt is an expense as well as a considerable factor in handling and shipping costs. An additional objection to the dry salting method is the frequent formation of salt stains on the hides.

In accordance with my invention the green hides are subjected, soon after removal from the animals, to a dilute solution containing a small amount of one or more chemicals which, for purposes of explanation and description, I will refer to herein and in the appended claims as "disinfectants".

It has been suggested heretofore to treat green hides with strong solutions of carbolic acid, creosote, thymol, alum and the like, but such treatments have not met with success, probably due to the concentration of the chemicals employed and detrimental effect upon the hides.

The chemicals which I have found operable as disinfectants in accordance with my invention include phenates such as sodium tri-chlorphenate and sodium ortho-phenyl phenate; halogenated phenols; hydrogenated phenols; animo phenols; phenolates; cresols and halogenated cresols; resorcinols; thymols and halogenated thymols; fluorides including silico-fluorides; naphthols and halogenated naphthols; and naphthalene sulfonic acids. Of this group, the phenates, naphthols, and inorganic silico-fluorides have been found particularly advantageous.

In the preferred modification of my invention a solution of sodium chloride, preferably saturated, is prepared and to this solution is added a small quantity of a disinfectant. Where the disinfectant is employed in combination with a salt solution it is generally sufficient to use approximately 0.1 per cent of the disinfectant, although a somewhat stronger solution may be used, so long as the quantity is kept sufficiently low to avoid such disadvantages as a tanning effect on the hides or setting of the hair.

The hides are removed from the animals and preferably immediately treated with the dilute disinfectant solution.

A thorough wetting of the hides with the solution is desirable, and this may be accomplished by dipping the hides in a vat containing the solution. Usually it will be preferred to soak the hides in the solution for ten to thirty minutes to insure an effective wetting. Other means such as spraying may be employed to treat the hides with the disinfectant solution.

After the soaking process is completed, the excess solution is drained off, and the hides may be folded into a suitable pack in the usual manner for convenience in handling.

Hides treated in accordance with my invention may be sent directly to the tannery without being stored for curing purposes. However, the treated hides may be stored for extended periods of time without decomposing or becoming stained. In one specific instance, a green hide was inoculated with a mixed culture of bacteria of the types customarily found in decomposing hides, and the hide was then soaked in a saturated salt solution containing 0.1 per cent disinfectant. This inoculated and treated hide was then placed in an incubator and held at blood temperature. After three months the hide was removed from the incubator and found to be perfectly preserved and "sweet".

While it is preferred to employ the disinfectant in combination with a salt solution, a dilute solution of the disinfectant may be employed alone if desired. When the salt is omitted from the solution the amount of the disinfectant may be of the order of 0.2 per cent in strength to obtain a preserving effect which will compare favorably with the effect of a saturated salt solution, containing 0.1 per cent of the disinfectant.

Hides treated as described heretofore appear to produce a better grade of leather than do hides which have been salt cured in the usual manner. That is, the yield of leather is greater and is free from salt stains. Comparative tests indicate that the leather is also stronger than similar leather from salt cured hides. It is possible that this is due to the slight decomposition of salt cured hides which leads to a loss of hide substance.

It is important that the disinfectant solution be dilute in order to prevent a deleterious action on the hides. Hides which have been treated with a dilute disinfectant solution are easily tanned and dehaired. In most cases, it will be desirable to maintain the concentration of the disinfectant solution below approximately 1 per cent, and it is preferred that the solution be between 0.1 per cent and 0.5 per cent.

I claim:
1. A method for preserving green hides, which comprises subjecting green hides to treatment with a solution containing one or more disinfectants of the group comprising sodium tri-chlor phenate, sodium silico-fluoride and beta naphthol.
2. A method for preserving green hides, which comprises subjecting green hides to treatment with a solution containing one or more disinfectants of the group comprising phenates, naphthol, and inorganic silico-fluorides.
3. A method for preserving green hides, which comprises subjecting green hides to treatment with a strong salt solution containing one or more disinfectants of the group comprising phenates, naphthols, and inorganic silico-fluorides.

VICTOR CONQUEST.